E. V. ANDERSON.
VALVE.
APPLICATION FILED DEC. 23, 1907.
909,510.
Patented Jan. 12, 1909.
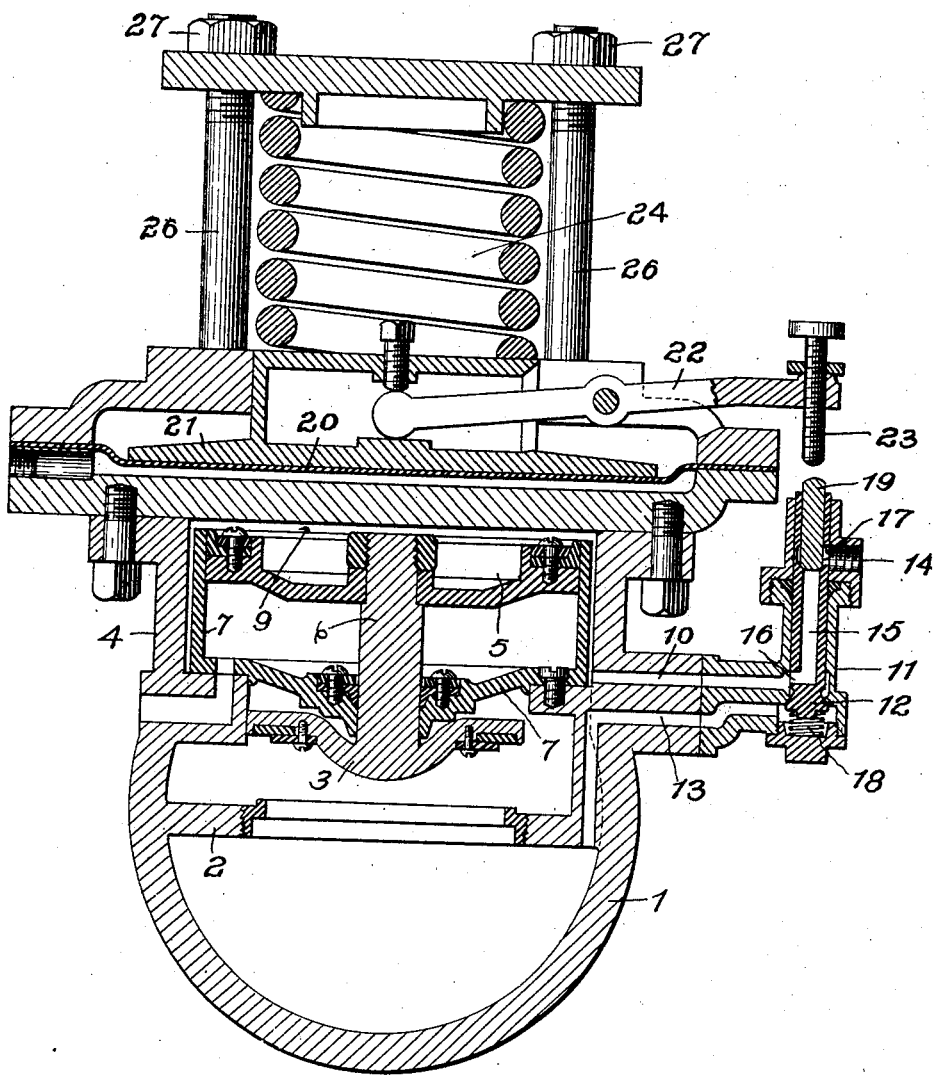
WITNESSES:
INVENTOR

UNITED STATES PATENT OFFICE.

EDWARD V. ANDERSON, OF MONESSEN, PENNSYLVANIA.

VALVE.

No. 909,510.  Specification of Letters Patent.  Patented Jan. 12, 1909.

Application filed December 23, 1907. Serial No. 407,829.

*To all whom it may concern:*

Be it known that I, EDWARD V. ANDERSON, residing at Monessen, in the county of Westmoreland and State of Pennsylvania, a citizen of the United States, have invented or discovered a certain new and useful Improvement in Valves, of which improvement the following is a specification.

The invention described herein relates to certain improvements in that class or kind of valves employed for controlling the flow of liquids to a tank or reservoir and has for its object a construction whereby the flow of fluid is checked when a predetermined height of fluid column has been attained and restored when such column is reduced to a certain predetermined lower level.

The invention is hereinafter more fully described and claimed.

In the accompanying drawing forming a part of this specification is shown a sectional elevation of my improved valve mechanism.

In the practice of my invention the inlet and outlet ports of the valve casing 1 are separated by a diaphragm 2 through which is formed a port or opening adapted to be closed by a valve 3. The valve casing is so connected in the supply line of pipe that the valve in seating moves in opposition to the direction of flow of fluid, so that the pressure of such fluid will always tend to unseat the valve. A cylinder 4 is formed in the casing, having its axis in line with the center of the port or opening in the diaphragm 2. The piston 5 arranged within this cylinder, is attached to the stem 6 of the valve. It is preferred that this cylinder should have a lining 7 having the lower head of the cylinder formed integral therewith. This lining has an external diameter somewhat less than the internal diameter of the cylinder 4 and is slightly shorter than the internal length of the cylinder, thereby forming an annular space 9, which being connected to the passage 10 forms in connection therewith the outlet and inlet ports for the cylinder.

The flow of water to and from the cylinder is controlled by a pilot valve mechanism, consisting of a case or shell 11, having an internal port controlled by a valve 12, said port forming a connection between the passage 10 and a passage 13 leading to the inlet side of the main valve casing 1. The passage 10 is also connected through the pilot valve mechanism with an escape port 14. In the construction shown the valve 12 is provided with a hollow stem 15, the axial passage therein having lateral openings 16 and 17 so located that when the valve 12 is held to its seat by the spring 18 the ports or openings will register respectively with the passage 10 and the escape port 14, thus permitting an escape of fluid from the cylinder, when the main valve and its piston are forced upward. When this main valve is to be closed, pressure is applied to the stem 15 to shift the valve 12 from its seat thereby permitting fluid under pressure to flow through the passage into the cylinder and as the piston 5 has a greater area than the surface of the valve 3 exposed to the same pressure, to force said valve to its seat.

In order to prevent an escape of fluid entering by the passage 13, after the unseating of valve 12 and the closure of port 17 by the wall of the shell 11, provision is made for a preliminary closing of port 17 prior to the shifting of valve 12. The closure for this port consists of a plug 19 fitting loosely in the axial opening in the stem 15, and adapted to bear at or adjacent to its inner end on a seat located between the ports 16 and 17. This plug which can be easily shifted when free to move, by the pressure of fluid escaping from the cylinder 4, to uncover the port 17, forms the bearing for the means employed for shifting the valve 12.

While not limiting the invention described herein to any particular construction of mechanism, that shown is efficient for the purpose.

On the top of the cylinder 4 is formed a chamber, the top thereof consisting of a flexible metal diaphragm 20, having a bearing plate or disk 21 secured thereto. A lever 22 is arranged with its inner end in engagement with the bearing plate or diaphragm so as to move therewith. The outer end of the lever carries an adjustable screw 23, which when the lever is shifted by the diaphragm, will bear on the plug 19 forcing it to its seat if not already seated, and on further movement shifting the valve 12 from its seat. The chamber formed by the diaphragm and the top of the cylinder is connected in suitable manner to the tank, the supply of which is to be controlled, so the pressure on the underside of the diaphragm will be proportional to the height of the fluid in the tank above the level of the chamber. In order to shift the diaphragm when the fluid in the tank has attained the desired height a spring 24 is arranged between the diaphragm and an abutment 25 carried by the posts 26. The tension of this spring can be regulated by the nuts 27.

I claim herein as my invention:

1. In a valve mechanism, the combination of a casing having a passage therethrough, a valve controlling such passage and adapted to be shifted to open position by fluid flowing through such passage, a cylinder and a piston connected to the valve and operative by the pressure of the supply fluid to shift the valve to closed position, and means adapted to be controlled by weight of a fluid column for regulating the flow of supply fluid to the cylinder.

2. In a valve mechanism, the combination of a casing having a passage therethrough, a valve controlling such passage and adapted to be shifted to open position by fluid flowing through such passage, a cylinder, a piston connected to said valve, a valve chamber connected to the cylinder and to the fluid supply, and provided with an outlet port and a valve controlling the flow of fluid to and from the cylinder and means operative by the weight of a fluid column for shifting said valve.

In testimony whereof, I have hereunto set my hand.

EDWARD V. ANDERSON.

Witnesses:
FRANCIS J. TOMASSON,
J. HERBERT BRADLEY.